(12) United States Patent
Luo et al.

(10) Patent No.: US 6,545,107 B2
(45) Date of Patent: Apr. 8, 2003

(54) MOLYDENUM-BASED CATALYST COMPOSITION FOR PRODUCING SYNDIOTACTIC 1,2-POLYBUTADIENE

(75) Inventors: Steven Luo, Akron, OH (US); Michael W. Hayes, Canton, OH (US); Dennis R. Brumbaugh, North Canton, OH (US)

(73) Assignee: Bridgestone Corporation, Tokyo (JP)

( * ) Notice: Subject to any disclaimer, the term of this patent is extended or adjusted under 35 U.S.C. 154(b) by 103 days.

(21) Appl. No.: 09/878,026

(22) Filed: Jun. 8, 2001

(65) Prior Publication Data

US 2002/0198337 A1 Dec. 26, 2002

(51) Int. Cl.$^7$ .............................. C08F 4/42; C08F 4/64
(52) U.S. Cl. ...................... 526/139; 526/128; 526/169; 526/335; 526/136; 526/348; 502/117; 502/121; 502/162
(58) Field of Search ................ 526/169, 139, 526/136, 335, 348, 128; 502/117, 121, 162

(56) References Cited

U.S. PATENT DOCUMENTS

| | | | | |
|---|---|---|---|---|
| 3,336,280 A | * | 8/1967 | Naylor et al. ............... 260/94.3 |
| 3,419,505 A | | 12/1968 | Marsico ........................ 260/2 |
| 3,451,987 A | | 6/1969 | Dawans et al. ............. 260/94.3 |
| 3,457,186 A | | 7/1969 | Marsico ....................... 252/429 |
| 3,457,250 A | | 7/1969 | Gaeth et al. ............... 260/94.3 |
| 3,498,963 A | | 3/1970 | Ichikawa et al. ........... 260/94.3 |
| 3,663,480 A | | 5/1972 | Zelinski et al. ............. 252/431 |
| 3,725,373 A | | 4/1973 | Yoo ....................... 260/88.7 R |
| 3,778,424 A | | 12/1973 | Sugiura et al. ............. 260/94.3 |
| 3,957,894 A | | 5/1976 | Saeki et al. .................. 260/666 |
| 4,048,418 A | | 9/1977 | Throckmorton ............. 526/138 |
| 4,148,983 A | | 4/1979 | Throckmorton ............. 526/139 |
| 4,168,357 A | | 9/1979 | Throckmorton et al. .... 526/139 |
| 4,168,374 A | | 9/1979 | Throckmorton et al. .... 526/139 |
| 4,182,813 A | | 1/1980 | Makino et al. ................ 526/92 |
| 4,379,889 A | | 4/1983 | Ashitaka et al. ............ 525/247 |
| 4,645,809 A | | 2/1987 | Bell ............................ 526/140 |
| 4,751,275 A | | 6/1988 | Witte et al. .................. 526/139 |
| 4,912,182 A | * | 3/1990 | Castner et al. .............. 526/142 |
| 5,356,997 A | | 10/1994 | Massie, II et al. .......... 525/237 |
| 5,891,963 A | | 4/1999 | Brookhart et al. ........ 525/326.1 |
| 5,919,875 A | | 7/1999 | Luo et al. .................... 526/139 |
| 6,197,888 B1 | | 3/2001 | Luo ............................ 525/247 |
| 6,303,692 B1 | * | 10/2001 | Luo ............................ 525/191 |

FOREIGN PATENT DOCUMENTS

WO     WO 00/75201     12/2000

OTHER PUBLICATIONS

Syndiotactic 1,2–Polybutadiene with Co–CS$_2$ Catalyst System I. Preparation Properties and Application of Highly Crystalline Syndiotactic 1,2–Polybutadiene, *Journal of Polymer Science: Polymer Chemistry Edition*, by H. Ashitaka et al., vol. 21, pp. 1853–1860, (1983).
"Conjugated Diene Polymerization," *Comprehensive Polymer Science*, by L. Porri and A. Giarrusso, Pergamon Press, Oxford, vol. 4, pp. 53–108, (1989).
English abstract of Japanese Patent No. 45011154, (1970).
English abstract of Japanese Patent No. 48006939, (1973).
English abstract of Japanese Patent No. 48064178, (1973).
English abstract of Japanese Patent No. 50154389, (1975).

* cited by examiner

*Primary Examiner*—David W. Wu
*Assistant Examiner*—Ling-Sui Choi
(74) *Attorney, Agent, or Firm*—Meredith E. Palmer; Art Reginelli

(57) ABSTRACT

A catalyst composition that is the combination of or the reaction product of ingredients comprising (a) an molybdenum-containing compound, (b) a silyl phosphonate, and (c) an organoaluminum compound.

20 Claims, No Drawings

MOLYDENUM-BASED CATALYST COMPOSITION FOR PRODUCING SYNDIOTACTIC 1,2-POLYBUTADIENE

FIELD OF THE INVENTION

This invention relates to a catalyst composition for polymerizing conjugated dienes such as 1,3-butadiene.

BACKGROUND OF THE INVENTION

Syndiotactic 1,2-polybutadiene is a high-vinyl polybutadiene that has a stereoregular structure in which the side-chain vinyl groups are located alternately on the opposite sides in relation to the polymeric main chain. Due to its stereoregular structure, syndiotactic 1,2-polybutadiene is a crystalline thermoplastic resin, but it exhibits the properties of both plastics and rubber, and therefore it has many uses. For example, films, fibers, and various molded articles can be made from syndiotactic 1,2-polybutadiene. It can also be blended into and co-cured with natural or synthetic rubbers in order to improve the properties thereof. Generally, syndiotactic 1,2-polybutadiene has a melting temperature within the range of about 195° C. to about 215° C., but due to processability considerations, it is generally desirable for syndiotactic 1,2-polybutadiene to have a melting temperature of less than about 195° C.

Various transition metal catalyst systems based on cobalt, titanium, vanadium, chromium, and molybdenum for preparing syndiotactic 1,2-polybutadiene have been reported. The majority of these catalyst systems, however, have no practical utility because they have low catalytic activity or poor stereoselectivity, and in some cases they produce low molecular weight polymers or partially crosslinked polymers unsuitable for commercial use.

Two cobalt-based catalyst systems are known for preparing syndiotactic 1,2-polybutadiene: (1) a catalyst system comprising a cobalt compound, a phosphine compound, an organoaluminum compound, and water and (2) a catalyst system comprising a cobalt compound, an organoaluminum compound, and carbon disulfide. These cobalt-based catalyst systems also have serious disadvantages.

The first cobalt catalyst system referenced above yields syndiotactic 1,2-polybutadiene having very low crystallinity. Also, this catalyst system develops sufficient catalytic activity only when halogenated hydrocarbon solvents are used as the polymerization medium; halogenated solvents present toxicity problems.

The second cobalt catalyst system uses carbon disulfide. Because of its low flash point, obnoxious smell, high volatility, and toxicity, carbon disulfide is difficult and dangerous to use, and requires expensive safety measures to prevent even minimal amounts escaping into the atmosphere. Furthermore, the syndiotactic 1,2-polybutadiene produced with this cobalt catalyst system has a very high melting temperature of about 200–210° C., which makes it difficult to process the polymer. Although the melting temperature of the syndiotactic 1,2-polybutadiene produced with this cobalt catalyst system can be reduced by employing a catalyst modifier as a fourth catalyst component, the use of this catalyst modifier has adverse effects on the catalyst activity and polymer yields. Accordingly, many restrictions are required for the industrial utilization of these cobalt-based catalyst systems.

Coordination catalyst systems based on molybdenum-containing compounds, such as the combination of molybdenum acetylacetonate and triethylaluminum, are also known but they have shown very low catalytic activity and poor stereoselectivity for the polymerization of conjugated dienes. The product mixture often contains oligomers, low molecular weight liquid polymers, and partially crosslinked polymers. Therefore, these molybdenum-based catalyst systems have no industrial utility.

U.S. Pat. No. 3,336,280 discloses a process for polymerizing 1,3-butadiene to rubbery 1,2-polybutadiene by using a catalyst system comprising molybdenum pentachloride, a trialkylaluminum compound, and a promoter compound selected from the group consisting of ethers, amines, amides, and alkylideneamines. U.S. Pat. No. 3,451,987 describes a process for preparing amorphous 1,2-polybutadiene by polymerizing 1,3-butadiene in the presence of a catalyst system comprising a molybdenum halide or oxyhalide and a dialkylaluminum alkoxide. Japanese Pat. No. 75,154,389 (See Chemical Abstracts 1976, Vol. 84, 151913k) discloses a process that produces rubbery 1,2-polybutadiene by polymerizing 1,3-butadiene in the presence of a catalyst system consisting of molybdenum pentachloride, an organoaluminum compound, and phenol. U.S. Pat. No. 4,912,182 discloses a process for synthesizing high vinyl polybutadiene by polymerizing 1,3-butadiene in the presence of a catalyst system comprising a molybdenum-containing compound prepared by modifying molybdenum pentachloride, molybdenum trichloride, or molybdenum tetrachloride with an alkyl carboxylic acid or an aryl carboxylic acid, and an aluminum-containing compound prepared by modifying a trialkylaluminum compound with 2-allylphenol. These molybdenum-based catalyst systems, however, produce amorphous atactic 1,2-polybutadiene, which has no crystallinity.

Because syndiotactic 1,2-polybutadiene is a useful product and the catalysts known heretofore in the art have many shortcomings, it would be advantageous to develop a new and significantly improved catalyst composition that has high catalytic activity and stereoselectivity for polymerizing 1,3-butadiene into syndiotactic 1,2-polybutadiene.

SUMMARY OF THE INVENTION

In general the present invention provides a catalyst composition that is the combination of or the reaction product of ingredients comprising (a) an molybdenum-containing compound (b) a silyl phosphonate, and (c) an organoaluminum compound.

The present invention also includes a catalyst composition formed by a process comprising the steps of combining (a) a molybdenum-containing compound, (b) a silyl phosphonate, and (c) an organoaluminum compound.

The present invention further includes a process for forming conjugated diene polymers comprising the step of polymerizing conjugated diene monomers in the presence of a catalytically effective amount of a catalyst composition formed by combining (a) a molybdenum-containing compound, (b) a silyl phosphonate, and (c) an organoaluminum compound.

Advantageously, the catalyst composition of the present invention does not contain carbon disulfide. Therefore, the toxicity, objectionable smell, dangers, and expense associated with the use of carbon disulfide are eliminated. In addition, the catalyst composition of this invention is very versatile and capable of producing syndiotactic 1,2-polybutadiene with a wide range of melting temperatures without the need for a catalyst modifier that may have adverse effects on the catalyst activity and polymer yields.

Further, the molybdenum-containing compounds that are utilized in the catalyst composition of this invention are generally stable, inexpensive, relatively innocuous, and readily available. Furthermore, the catalyst composition of this invention has high catalytic activity in a wide variety of solvents including the environmentally-preferred nonhalogenated solvents such as aliphatic and cycloaliphatic hydrocarbons.

DETAILED DESCRIPTION OF ILLUSTRATIVE EMBODIMENTS

The present invention is directed toward a catalyst composition that can be employed to synthesize syndiotactic 1,2-polybutadiene. It has now been found that 1,3-butadiene can be efficiently polymerized into syndiotactic 1,2-polybutadiene by using this molybdenum-based catalyst composition. Other conjugated dienes can likewise be polymerized.

The catalyst composition of the present invention is formed by combining (a) a molybdenum-containing compound, (b) a silyl phosphonate, and (c) an organoaluminum compound. In addition to these three catalyst ingredients (a), (b), and (c), other organometallic compounds or Lewis bases can also be added, if desired.

Various molybdenum-containing compounds or mixtures thereof can be employed as ingredient (a). Molybdenum-containing compounds that are soluble in a hydrocarbon solvents such as aromatic hydrocarbons, aliphatic hydrocarbons, or cycloaliphatic hydrocarbons are preferred. Hydrocarbon-insoluble molybdenum-containing compounds, however, can be suspended in the polymerization medium to form the catalytically active species and are therefore also useful.

The molybdenum atom in the molybdenum-containing compounds can be in various oxidation states ranging from 0 up to +6. Suitable molybdenum-containing compounds that can be utilized include, but are not limited to, molybdenum carboxylates, molybdenum organophosphates, molybdenum organophosphonates, molybdenum organophosphinates, molybdenum carbamates, molybdenum dithiocarbamates, molybdenum xanthates, molybdenum β-diketonates, molybdenum alkoxides or aryloxides, molybdenum halides, molybdenum pseudo-halides, molybdenum oxyhalides, organomolybdenum compounds, and mixtures thereof.

Suitable molybdenum carboxylates include molybdenum formate, molybdenum acetate, molybdenum acrylate, molybdenum methacrylate, molybdenum valerate, molybdenum gluconate, molybdenum citrate, molybdenum fumarate, molybdenum lactate, molybdenum maleate, molybdenum oxalate, molybdenum 2-ethylhexanoate, molybdenum neodecanoate, molybdenum naphthenate, molybdenum stearate, molybdenum oleate, molybdenum benzoate, and molybdenum picolinate.

Suitable molybdenum organophosphates include molybdenum dibutyl phosphate, molybdenum dipentyl phosphate, molybdenum dihexyl phosphate, molybdenum diheptyl phosphate, molybdenum dioctyl phosphate, molybdenum bis(1-methylheptyl) phosphate, molybdenum bis(2-ethylhexyl) phosphate, molybdenum didecyl phosphate, molybdenum didodecyl phosphate, molybdenum dioctadecyl phosphate, molybdenum dioleyl phosphate, molybdenum diphenyl phosphate, molybdenum bis(p-nonylphenyl) phosphate, molybdenum butyl(2-ethylhexyl) phosphate, molybdenum (1-methylheptyl) (2-ethylhexyl) phosphate, and molybdenum (2-ethylhexyl) (p-nonylphenyl) phosphate.

Suitable molybdenum organophosphonates include molybdenum butyl phosphonate, molybdenum pentyl phosphonate, molybdenum hexyl phosphonate, molybdenum heptyl phosphonate, molybdenum octyl phosphonate, molybdenum (1-methylheptyl) phosphonate, molybdenum (2-ethylhexyl) phosphonate, molybdenum decyl phosphonate, molybdenum dodecyl phosphonate, molybdenum octadecyl phosphonate, molybdenum oleyl phosphonate, molybdenum phenyl phosphonate, molybdenum (p-nonylphenyl) phosphonate, molybdenum butyl butylphosphonate, molybdenum pentyl pentylphosphonate, molybdenum hexyl hexylphosphonate, molybdenum heptyl heptylphosphonate, molybdenum octyl octylphosphonate, molybdenum (1-methylheptyl) (1-methylheptyl) phosphonate, molybdenum (2-ethylhexyl) (2-ethylhexyl) phosphonate, molybdenum decyl decylphosphonate, molybdenum dodecyl dodecylphosphonate, molybdenum octadecyl octadecylphosphonate, molybdenum oleyl oleylphosphonate, molybdenum phenyl phenylphosphonate, molybdenum (p-nonylphenyl) (p-nonylphenyl)phosphonate, molybdenum butyl (2-ethylhexyl)phosphonate, molybdenum (2-ethylhexyl)butylphosphonate, molybdenum (1-methylheptyl) (2-ethylhexyl)phosphonate, molybdenum (2-ethylhexyl) (1-methylheptyl)phosphonate, molybdenum (2-ethylhexyl) (p-nonylphenyl)phosphonate, and molybdenum (p-nonylphenyl) (2-ethylhexyl)phosphonate.

Suitable molybdenum organophosphinates include molybdenum butylphosphinate, molybdenum pentylphosphinate, molybdenum hexylphosphinate, molybdenum heptylphosphinate, molybdenum octylphosphinate, molybdenum (1-methylheptyl)phosphinate, molybdenum (2-ethylhexyl)phosphinate, molybdenum decylphosphinate, molybdenum dodecylphosphinate, molybdenum octadecylphosphinate, molybdenum oleylphosphinate, molybdenum phenylphosphinate, molybdenum (p-nonylphenyl)phosphinate, molybdenum dibutylphosphinate, molybdenum dipentylphosphinate, molybdenum dihexylphosphinate, molybdenum diheptylphosphinate, molybdenum dioctylphosphinate, molybdenum bis(1-methylheptyl)phosphinate, molybdenum bis(2-ethylhexyl)phosphinate, molybdenum didecylphosphinate, molybdenum didodecylphosphinate, molybdenum dioctadecylphosphinate, molybdenum dioleylphosphinate, molybdenum diphenylphosphinate, molybdenum bis (p-nonylphenyl)phosphinate, molybdenum butyl(2-ethylhexyl)phosphinate, molybdenum (1-methylheptyl)(2-ethylhexyl)phosphinate, and molybdenum (2-ethylhexyl) (p-nonylphenyl)phosphinate.

Suitable molybdenum carbamates include molybdenum dimethylcarbamate, molybdenum diethylcarbamate, molybdenum diisopropylcarbamate, molybdenum dibutylcarbamate, and molybdenum dibenzylcarbamate.

Suitable molybdenum dithiocarbamates include molybdenum dimethyldithiocarbamate, molybdenum diethyldithiocarbamate, molybdenum diisopropyldithiocarbamate, molybdenum dibutyldithiocarbamate, and molybdenum dibenzyldithiocarbamate.

Suitable molybdenum xanthates include molybdenum methylxanthate, molybdenum ethylxanthate, molybdenum isopropylxanthate, molybdenum butylxanthate, and molybdenum benzylxanthate.

Suitable molybdenum β-diketonates include molybdenum acetylacetonate, molybdenum trifluoroacetylacetonate, molybdenum hexafluoroacetylacetonate, molybdenum benzoylacetonate, molybdenum 2,2,6,6-tetramethyl-3,5- heptanedionate, molybdenum dioxide bis(acetylacetonate), molybdenum dioxide bis(trifluoroacetylacetonate), molybdenum dioxide bis(hexafluoroacetylacetonate), molybdenum dioxide bis(benzoylacetonate), and molybdenum dioxide bis(2,2,6,6-tetramethyl-3,5-heptanedionate).

Suitable molybdenum alkoxides or aryloxides include molybdenum methoxide, molybdenum ethoxide, molybdenum isopropoxide, molybdenum 2-ethylhexoxide, molybdenum phenoxide, molybdenum nonylphenoxide, and molybdenum naphthoxide.

Suitable molybdenum halides include molybdenum hexafluoride, molybdenum pentafluoride, molybdenum tetrafluoride, molybdenum trifluoride, molybdenum pentachloride, molybdenum tetrachloride, molybdenum trichloride, molybdenum tetrabromide, molybdenum tribromide, molybdenum triiodide, and molybdenum diiodide.

Some specific examples of suitable molybdenum pseudohalides include molybdenum cyanide, molybdenum cyanate, molybdenum thiocyanate, and molybdenum azide.

Suitable molybdenum oxyhalides include molybdenum oxytetrafluoride, molybdenum dioxydifluoride, molybdenum oxytetrachloride, molybdenum oxytrichloride, molybdenum dioxydichloride, molybdenum oxytribromide, and molybdenum dioxydibromide.

The term "organomolybdenum compounds" refers to any molybdenum compounds containing at least one molybdenum-carbon bond. Suitable organomolybdenum compounds include tris(allyl)molybdenum, tris(methallyl) molybdenum, tris(crotyl)molybdenum, bis(cyclopentadienyl)molybdenum, bis(pentamethylcyclopentadienyl)molybdenum, bis(ethylbenzene)molybdenum, bis(mesitylene)molybdenum, bis(pentadienyl)molybdenum, bis(2,4-dimethylpentadienyl)molybdenum, bis(allyl)tricarbonylmolybdenum, (cyclopentadienyl)(pentadienyl)molybdenum, tetra(1-norbornyl)molybdenum (trimethylenemethane) tetracarbonylmolybdenum, bis(butadiene) dicarbonylmolybdenum, (butadiene) tetracarbonylmolybdenum, and bis(cyclooctatetraene) molybdenum.

Useful silyl phosphonate compounds that can be employed as ingredient (b) include acyclic silyl phosphonates, cyclic silyl phosphonates, and mixtures thereof. Acyclic silyl phosphonates may be represented by the following structure:

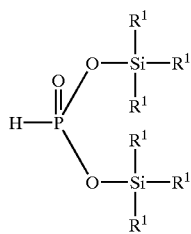

where each $R^1$, which may be the same or different, is a hydrogen atom or a mono-valent organic group. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. The acyclic silyl phosphonates may be associated in dimeric, trimeric or oligomeric forms by hydrogen bonding.

Suitable acyclic silyl phosphonates are bis(trimethylsilyl) phosphonate, bis(dimethylsilyl)phosphonate, bis(triethylsilyl)phosphonate, bis(diethylsilyl) phosphonate, bis(tri-n-propylsilyl)phosphonate, bis(di-n-propylsilyl) phosphonate, bis(triisopropylsilyl)phosphonate, bis(diisopropylsilyl)phosphonate, bis(tri-n-butylsilyl) phosphonate, bis(di-n-butylsilyl)phosphonate, bis(triisobutylsilyl)phosphonate, bis(diisobutylsilyl) phosphonate, bis(tri-t-butylsilyl)phosphonate, bis(di-t-butylsilyl)phosphonate, bis(trihexylsilyl)phosphonate, bis(dihexylsilyl)phosphonate, bis(trioctylsilyl)phosphonate, bis(dioctylsilyl)phosphonate, bis(tricyclohexylsilyl) phosphonate, bis(dicyclohexylsilyl)phosphonate, bis(triphenylsilyl)phosphonate, bis(diphenylsilyl)phosphonate, bis(tri-p-tolylsilyl)phosphonate, bis(di-p-tolylsilyl) phosphonate, bis(tribenzylsilyl)phosphonate, bis(dibenzylsilyl)phosphonate, bis(methyldiethylsilyl) phosphonate, bis(methyldi-n-propylsilyl)phosphonate, bis(methyldiisopropylsilyl)phosphonate, bis(methyldi-n-butylsilyl)phosphonate, bis(methyldiisobutylsilyl) phosphonate, bis(methyldi-t-butylsilyl)phosphonate, bis(methyldiphenylsilyl)phosphonate, bis(dimethylethylsilyl) phosphonate, bis(dimethyl-n-propylsilyl)phosphonate, bis(dimethylisopropylsilyl)phosphonate, bis(dimethyl-n-butylsilyl)phosphonate, bis(dimethylisobutylsilyl) phosphonate, bis(dimethyl-t-butylsilyl)phosphonate, bis(dimethylphenylsilyl)phosphonate, bis(t-butyldiphenylsilyl) phosphonate, bis[tris(2-ethylhexyl)silyl]phosphonate, bis[bis(2-ethylhexyl)silyl]phosphonate, bis[tris(nonylphenyl)silyl]phosphonate, bis[tris-(2,4,6-trimethylphenyl)silyl]phosphonate, bis[bis(2,4,6-trimethylphenyl)silyl] phosphonate, bis[tris(4-fluorophenyl)silyl]phosphonate, bis[bis(4-fluorophenyl)silyl]phosphonate, bis[tris(pentafluorophenyl)silyl]phosphonate, bis[tris(trifluoromethyl)sily]phosphonate, bis[tris(2,2,2-trifluoroethyl)silyl]phosphonate, bis[tris(trimethylsilyl) silyl]phosphonate, bis[tris(trimethylsilylmethyl)silyl] phosphonate, bis[tris(dimethylsilyl)silyl]phosphonate, bis[tris(2-butoxyethyl)silyl]phosphonate, bis(trimethoxysilyl) phosphonate, bis(triethoxysilyl)phosphonate, bis(triphenoxysilyl)phosphonate, bis[tris(trimethylsilyloxy) silyl]phosphonate, bis[tris(dimethylsilyloxy)silyl] phosphonate, or mixtures thereof.

Cyclic silyl phosphonates contain a ring structure that is formed by joining the two silicon atoms together or by bridging the two silicon atoms with one or more divalent organic groups. These cyclic silyl phosphonates may be represented by the following structure:

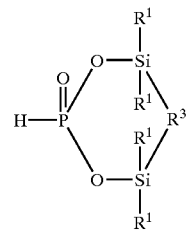

where each $R^2$, which may be the same or different, is a hydrogen atom or a mono-valent organic group, and $R^3$ is a bond between the silicon atoms or a divalent organic group. Bicyclic silyl phosphonates may be formed by joining two $R^2$ groups, and therefore the term cyclic silyl phosphonate will include multi-cyclic silyl phosphonates. Preferably, each $R^2$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl group, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, $R^3$ is a hydrocarbylene group such as, but not limited to, alkylene, substituted alkylene, cycloalkylene, substituted cycloalkylene, alkenylene, substituted alkenylene, cycloalkenylene, substituted cycloalkenylene, arylene, and substituted arylene groups, with each group preferably containing from 1 carbon atom, or the appropriate minimum number of carbon atoms to form the group, up to about 20 carbon atoms. These hydrocarbylene groups may contain heteroatoms such as, but not limited to, nitrogen, oxygen, silicon, sulfur, and phosphorus atoms. The cyclic silyl phosphonates may be associated in dimeric, trimeric or oligomeric forms by hydrogen bonding.

Suitable cyclic silyl phosphonates are 2-oxo-(2H)-4,5-disila-1,3,2-dioxaphospholane, 2-oxo-(2H)-4,5-disila-4,4,5,5-tetramethyl-1,3,2-dioxaphospholane, 2-oxo-(2H)-4,5-disila-4,4,5,5-tetraethyl-1,3,2-dioxaphospholane, 2-oxo-(2H)-4,5-disila-4,4,5,5-tetraphenyl-1,3,2-dioxaphospholane, 2-oxo-(2H)-4,5-disila-4,4,5,5-tetrabenzyl-1,3,2-dioxaphospholane, 2-oxo-(2H)-4,5-disila-4,5-dimethyl-1,3,2-dioxaphospholane, 2-oxo-(2H)-4,5-disila-4,5-diethyl-1,3,2-dioxaphospholane, 2-oxo-(2H)-4,5-disila-4,5-diphenyl-1,3,2-dioxaphospholane, 2-oxo-(2H)-4,5-disila-4,5-dibenzyl-1,3,2-dioxaphospholane, 2-oxo-(2H)-4.5-disila-4-methyl-1,3,2-dioxaphospholane, 2-oxo-(2H)-4,6-disila-1,3,2-dioxaphosphorinane, 2-oxo-(2H)-4,6-disila-4,4,6,6-tetramethyl-1,3,2-dioxaphosphorinane, 2-oxo-(2H)-4,6-disila-4,4,6,6-tetraethyl-1,3,2-dioxaphosphorinane, 2-oxo-(2H)-4,6-disila-4,4,6,6-tetraphenyl-1,3,2-dioxaphosphorinane, 2-oxo-(2H)-4,6-disila-4,4,6,6-tetrabenzyl-1,3,2-dioxaphosphorinane, 2-oxo-(2H)-4,6-disila-4,6-dimethyl-1,3,2-dioxaphosphorinane, 2-oxo-(2H)-4,6-disila-4,6-diethyl-1,3,2-dioxaphosphorinane, 2-oxo-(2H)-4,6-disila-4,6-diphenyl-1,3,2-dioxaphosphorinane, 2-oxo-(2H)-4,6-disila-4,6-dibenzyl-1,3,2-dioxaphosphorinane, 2-oxo-(2H)-4,6-disila-5,5-dimethyl-1,3,2-dioxaphosphorinane, 2-oxo-(2H)-4,6-disila-5,5-diethyl-1,3,2-dioxaphosphorinane, 2-oxo-(2H)-4,6-disila-5,5-diphenyl-1,3,2-dioxaphosphorinane, 2-oxo-(2H)-4,6-disila-5,5-dibenzyl-1,3,2-dioxaphosphorinane, 2-oxo-(2H)-4,6-disila-5-ethyl-5-methyl-1,3,2-dioxaphosphorinane, 2-oxo-(2H)-4,6-disila-5-methyl-5-propyl-1,3,2-dioxaphosphorinane, 2-oxo-(2H)-4,6-disila-5-butyl-5-ethyl-1,3,2-dioxaphosphorinane, 2-oxo-(2H)-4,6-disila-4-isopropyl-5,5-dimethyl-1,3,2-dioxaphosphorinane, 2-oxo-(2H)-4,6-disila-4-propyl-5-ethyl-1,3,2-dioxaphosphorinane, 2-oxo-(2H)-4,6-disila-4-methyl-1,3,2-dioxaphosphorinane, and the like. Mixtures of the above cyclic silyl phosphonates may also be utilized.

Various organoaluminum compounds can be used as ingredient (c). The term "organoaluminum compound" refers to any aluminum compound containing at least one covalent aluminum-carbon bond. Organoaluminum compounds that are soluble in a hydrocarbon solvent are preferred.

Preferable organoaluminum compounds are represented by the general formula $AlR_nX_{3-n}$, where each R, which may be the same or different, is a mono-valent organic group that is attached to the aluminum atom via a carbon atom, where each X, which may be the same or different, is a hydrogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, each X is a carboxylate group, an alkoxide group, or an aryloxide group, with each group preferably containing from 1 carbon atom, or the appropriate minimum number of carbon atoms to form the group, up to about 20 carbon atoms.

Suitable types of organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum aryloxide, hydrocarbylaluminum diaryloxide, and the like, and mixtures thereof. Trihydrocarbylaluminum compounds are generally preferred.

Suitable organoaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl) aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, ethyldibenzylaluminum, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride, ethylaluminum dihydride, n-propylaluminum dihydride, isopropylaluminum dihydride, n-butylaluminum dihydride, isobutylaluminum dihydride, n-octylaluminum dihydride, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis (stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds is aluminoxanes. Aluminoxanes comprise oligomeric linear aluminoxanes that can be represented by the general formula:

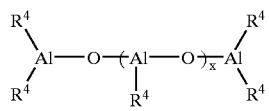

and oligomeric cyclic aluminoxanes that can be represented by the general formula:

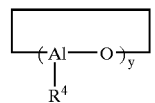

where x is an integer of 1 to about 100, preferably about 10 to about 50; y is an integer of 2 to about 100, preferably about 3 to about 20; where each $R^4$, which may be the same or different, is a mono-valent organic group that is attached to the aluminum atom via a carbon atom. Preferably, each $R^4$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. The number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20–80% of the methyl groups of methylaluminoxane with $C_2$ to $C_{12}$ hydrocarbyl groups, preferably with isobutyl groups, by using techniques known to those skilled in the art.

The catalyst composition has very high catalytic activity for polymerizing conjugated dienes into conjugated diene polymers, especially 1,3-butadiene into syndiotactic 1,2-polybutadiene, over a wide range of catalyst concentrations and catalyst ingredient ratios. The polymers having the most desirable properties, however, are obtained within a narrower range of catalyst concentrations and catalyst ingredient ratios. Further, it is believed that the three catalyst ingredients (a), (b), and (c) may interact to form an active catalyst species. Accordingly, the optimum concentration for any one catalyst ingredient is dependent upon the concentrations of the other catalyst ingredients. The molar ratio of the silyl phosphonate to the molybdenum-containing compound (P/Mo) can be varied from about 0.5:1 to about 50:1, more preferably from about 1:1 to about 25:1, and even more preferably from about 2:1 to about 10:1. The molar ratio of the organoaluminum compound to the molybdenum-containing compound (Al/Mo) can be varied from about 1:1 to about 200:1, more preferably from about 2:1 to about 100:1, and even more preferably from about 3:1 to about 50:1.

The catalyst composition is formed by combining or mixing the three catalyst ingredients (a), (b), and (c). Although an active catalyst species is believed to result from this combination, the degree of interaction or reaction between the various ingredients or components is not known with any great degree of certainty. Therefore, the term "catalyst composition" encompasses a simple mixture of the ingredients, a complex of the various ingredients that is caused by physical or chemical forces of attraction, a chemical reaction product of the ingredients, or a combination of the foregoing.

The catalyst composition may be formed in situ by adding the three catalyst ingredients to a solution containing monomer and solvent, or simply bulk monomer, in either a stepwise or simultaneous manner. When adding the catalyst ingredients in a stepwise manner, the catalyst ingredients can be added in various sequences. Preferably, the molybdenum-containing compound is added first, followed by the silyl phosphonate, and then followed by the organoaluminum compound.

Second, the three catalyst ingredients may be pre-mixed outside the polymerization system at an appropriate temperature, which is generally from about −20° C. to about 80° C., and the resulting catalyst composition is then added to the monomer solution.

Third, the catalyst composition may be pre-formed in the presence of 1,3-butadiene monomer. That is, the three catalyst ingredients are pre-mixed in the presence of a small amount of 1,3-butadiene monomer at an appropriate temperature, which is generally from about −20° C. to about 80° C. The amount of 1,3-butadiene monomer that is used for pre-forming the catalyst can range from about 1 to about 500 moles per mole of the molybdenum-containing compound, more preferably from about 5 to about 250 moles per mole of the molybdenum-containing compound, and even more preferably from about 10 to about 100 moles per mole of the molybdenum-containing compound. The resulting catalyst composition is then added to the remainder of the 1,3-butadiene monomer that is to be polymerized.

Fourth, the catalyst composition may be formed by using a two-stage procedure. The first stage involves reacting the molybdenum-containing compound with the organoaluminum compound in the presence of a small amount of 1,3-butadiene monomer at an appropriate temperature, which is generally from about −20° C. to about 80° C. In the second stage, the foregoing reaction mixture and the silyl phosphonate are charged in either a stepwise or simultaneous manner to the remainder of the 1,3-butadiene monomer that is to be polymerized.

Fifth, an alternative two-stage procedure may also be employed. A molybdenum-ligand complex is first formed by pre-combining the molybdenum-containing compound with the silyl phosphonate. Once formed, this molybdenum-ligand complex is then combined with the organoaluminum compound to form the active catalyst species. The molybdenum-ligand complex can be formed separately or in the presence of the 1,3-butadiene monomer that is to be polymerized. This complexation reaction can be conducted at any convenient temperature at normal pressure, but for an increased rate of reaction, it is preferable to perform this reaction at room temperature or above. The time required for the formation of the molybdenum-ligand complex is usually within the range of about 10 minutes to about 2 hours after mixing the molybdenum-containing compound with the silyl phosphonate. The temperature and time used for the formation of the molybdenum-ligand complex will depend upon several variables including the particular starting materials and the solvent employed. Once formed, the molybdenum-ligand complex can be used without isolation from the complexation reaction mixture. If desired, however, the molybdenum-ligand complex may be isolated from the complexation reaction mixture before use.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. it is normally desirable to select an organic solvent that is inert with respect to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred.

The catalyst composition exhibits very high catalytic activity for the polymerization of 1,3-butadiene into syndiotactic 1,2-polybutadiene. Hence, the present invention further provides a process for producing syndiotactic 1,2-polybutadiene by using the catalyst composition of this invention. Although a preferred embodiment is directed toward the polymerization of 1,3-butadiene into syndiotactic 1,2-polybutadiene, other conjugated dienes can also be polymerized by using the catalyst composition of this invention. Specific examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene, or mixtures thereof.

The production of conjugated diene polymers, such as syndiotactic 1,2-polybutadiene, is accomplished by polymerizing 1,3-butadiene in the presence of a catalytically effective amount of the foregoing catalyst composition. The total catalyst concentration to be employed in the polymerization mass depends on the interplay of various factors such as the purity of the ingredients, the polymerization temperature, the polymerization rate and conversion desired, and many other factors. Accordingly, a specific total catalyst concentration cannot be definitively set forth except to say that catalytically effective amounts of the respective catalyst ingredients should be used. Generally, the amount of the molybdenum-containing compound used can be varied from about 0.01 to about 2 mmol per 100 g of 1,3-butadiene monomer, more preferably from about 0.05 to about 1.0 mmol per 100 g of 1,3-butadiene monomer, and even more preferably from about 0.1 to about 0.6 mmol per 100 g of 1,3-butadiene monomer.

The polymerization of conjugated dienes is preferably carried out in an organic solvent as the diluent. Accordingly, a solution polymerization system may be employed in which both the monomer to be polymerized and the polymer formed are soluble in the polymerization medium. Alternatively, a precipitation polymerization system may be employed by choosing a solvent in which the polymer formed is insoluble. In both cases, an amount of organic solvent in addition to the amount of organic solvent that may be used in preparing the catalyst composition is usually added to the polymerization system. The additional organic solvent may be the same as or different from the organic solvent used in preparing the catalyst composition. Desirably, an organic solvent that is inert with respect to the catalyst composition employed to catalyze the polymerization is selected. Exemplary hydrocarbon solvents have been set forth above. When a solvent is employed, the concentration of the monomer to be polymerized is not limited to a special range. However, the concentration of the monomer present in the polymerization medium at the beginning of the polymerization be in a range of from about 3% to about 80% by weight, more preferably from about 5% to about 50% by weight, and even more preferably from about 10% to about 30% by weight.

The polymerization of conjugated dienes may also be carried out by means of bulk polymerization, which refers to a polymerization environment where no solvents are employed. The bulk polymerization can be conducted either in a condensed liquid phase or in a gas phase.

In performing the polymerization of conjugated dienes, a molecular weight regulator may be employed to control the molecular weight of the conjugated diene polymers to be produced. As a result, the scope of the polymerization system can be expanded in such a manner that it can be used for the production of syndiotactic 1,2-polybutadiene having a wide range of molecular weights. Suitable molecular weight regulators include, but are not limited to, α-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5- hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene, and vinylacetylene; and mixtures thereof. The amount of the molecular weight regulator used, expressed in parts per hundred parts by weight of the 1,3-butadiene monomer (phm), is from about 0.01 to about 10 phm, preferably from about 0.02 to about 2 phm, and more preferably from about 0.05 to about 1 phm.

The molecular weight of the resultant conjugated diene polymers can also be effectively controlled by conducting the polymerization of the monomer in the presence of hydrogen gas. In this case, the partial pressure of hydrogen gas is preferably from about 0.01 to about 50 atmospheres.

The polymerization of conjugated dienes may be carried out as a batch process, a continuous process, or a semi-continuous process. In the semi-continuous process, the conjugated diene monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol may be added along with, before or after the addition of the terminator. The amount of the antioxidant employed is usually in the range of 0.2% to 1% by weight of the polymer product. When the polymerization has been stopped, the conjugated diene polymer product can be recovered from the polymerization mixture by utilizing conventional procedures of desolventization and drying. For instance, the syndiotactic 1,2-polybutadiene may be isolated from the polymerization mixture by coagulation of the polymerization mixture with an alcohol such as methanol, ethanol, or isopropanol, or by steam distillation of the solvent and the unreacted 1,3-butadiene monomer, followed by filtration. The polymer product is then dried to remove residual amounts of solvent and water.

Advantageously, the molybdenum-based catalyst composition can be manipulated to vary the characteristics of the resulting syndiotactic 1,2-polybutadiene. Namely, the syndiotactic 1,2-polybutadiene can have various melting temperatures, molecular weights, 1,2-linkage contents, and syndiotacticities, all of which are dependent upon the selection of the catalyst ingredients and the ingredient ratios. For example, it has been found that the melting temperature, molecular weight, 1,2-linkage content, and syndiotacticity of the syndiotactic 1,2-polybutadiene can be increased by synthesizing the polymer with the catalyst composition of this invention wherein the organoaluminum compound employed contains sterically bulky organic groups in lieu of sterically less bulky organic groups. Likewise, the melting temperature, 1,2-linkage content, and syndiotacticity of the syndiotactic 1,2-polybutadiene can also be increased by synthesizing the polymer with the catalyst composition of this invention wherein the two silicon atoms of the silyl phosphonate employed are bonded to sterically bulky organic groups in lieu of sterically less bulky organic groups. Non-limiting examples of sterically bulky organic groups include isopropyl, isobutyl, t-butyl, neopentyl, 2-ethylhexyl, cyclohexyl, 1-methylcyclopentyl, and 2,6-dimethylphenyl groups. Non-limiting examples of sterically less bulky organic groups include methyl, fluoromethyl, ethyl, n-propyl, n-butyl, n-pentyl, n-hexyl, and n-octyl groups.

In a preferred embodiment, syndiotactic 1,2-polybutadiene having a melting temperature from about 110° C. to about 210° C. can be prepared. More preferably, syndiotactic 1,2-polybutadiene having a melting temperature from about 120° C. to about 200° C. can be prepared, and even more preferably, syndiotactic 1,2-polybutadiene having a melting temperature from about 130° C. to about 190° C. can be prepared. The 1,2-linkage content of the syndiotactic 1,2-polybutadiene is preferably from about 60% to about 99%, and more preferably from about 70% to about 95%. The syndiotacticity of the syndiotactic 1,2-polybutadiene is preferably from about 60% to about 99%, more preferably from about 70% to about 95%, and even more preferably from about 75% to 90%, as measured by $^{13}C$ NMR, where the foregoing are percentages of the racemic triad of the vinyl groups, excluding the vinyl groups adjacent to a monomer unit having a 1,4 microstructure.

The syndiotactic 1,2-polybutadiene produced with the catalyst composition has many uses. It can be blended into and co-cured with various natural or synthetic rubbers in order to improve the properties thereof. For example, it can be incorporated into elastomers in order to improve the green strength of those elastomers, particularly in tires. The supporting or reinforcing carcass of tires is particularly prone to distortion during tire building and curing procedures. For this reason, the incorporation of the syndiotactic 1,2-polybutadiene into rubber compositions that are utilized in the supporting carcass of tires has particular utility in preventing or minimizing this distortion. In addition, the incorporation of the syndiotactic 1,2-polybutadiene into tire tread compositions can reduce the heat build-up and improve the tear and wear resistance of tire treads. The syndiotactic 1,2-polybutadiene is also useful in the manufacture of films and packaging materials and in many molding applications.

In order to demonstrate the practice of the present invention, the following examples have been prepared and tested. The examples should not, however, be viewed as limiting the scope of the invention. The claims will serve to define the invention.

EXAMPLES

Example 1

Bis(trimethylsilyl)phosphonate (formula: $HP(O)(OSiMe_3)_2$) was synthesized by reacting anhydrous phosphorous acid ($H_3PO_3$) with hexamethyldisiloxane ($Me_3SiOSiMe_3$) in the presence of anhydrous zinc chloride as the catalyst.

Anhydrous phosphorous acid (33.1 g, 0.404 mol), hexamethyldisiloxane (98.4 g, 0.606 mol), anhydrous zinc chloride (2.0 g, 0.015 mol), and benzene (240 mL) were mixed in a round-bottom reaction flask that was connected to a Dean-Stark trap and a reflux condenser. The mixture was heated to reflux for 24 hours, with continuous removal of water via the Dean-Stark trap. The reaction flask was then connected to a distillation head and a receiving flask. The benzene solvent and the unreacted hexamethyldisiloxane were removed by distillation at atmospheric pressure. The remaining crude product was distilled under vacuum, yielding bis(trimethylsilyl)phosphonate as a colorless liquid (51.7 g, 0.228 mol, 57% yield). The identity of the product was established by nuclear magnetic resonance (NMR) spectroscopy. $^1$H NMR data (CDCl$_3$, 25° C., referenced to tetramethylsilane): δ6.85 (doublet, $^1J_{HP}$=699 Hz, 1 H, H—P), 0.31 (singlet, 18 H, CH$_3$). $^{13}$P NMR data (CDCl$_3$, 25° C., referenced to external 85% H$_3$PO$_4$): δ−14.2 (doublet, $^1J_{HP}$=698 Hz).

Example 2

Bis(triethylsilyl) phosphonate (formula: HP(O)(OSiEt$_3$)$_2$) was synthesized by reacting anhydrous phosphorous acid (H$_3$PO$_3$) with hexaethyldisiloxane (Et$_3$SiOSiEt$_3$) in the presence of anhydrous zinc chloride as the catalyst.

Anhydrous phosphorous acid (22.1 g, 0.269 mol), hexaethyldisiloxane (99.5 g, 0.404 mol), anhydrous zinc chloride (1.33 g, 0.010 mol), and toluene (230 mL) were mixed in a round-bottom reaction flask that was connected to a Dean-Stark trap and a reflux condenser. The mixture was heated to reflux for 29 hours, with continuous removal of water via the Dean-Stark trap. The reaction flask was then connected to a distillation head and a receiving flask. The toluene solvent and the unreacted hexaethyldisiloxane were removed by distillation at atmospheric pressure. The remaining crude product was distilled under vacuum, yielding bis(triethylsilyl)phosphonate as a colorless liquid (67.9 g, 0.219 mol, 81% yield). The identity of the product was established by nuclear magnetic resonance (NMR) spectroscopy. $^1$H NMR data (CDCl$_3$, 25° C., referenced to tetramethylsilane): δ6.92 (doublet, $^1J_{HP}$=695 Hz, 1 H, H—P), 1.01 (triplet, $^3J_{HH}$=7.4, 18 H, CH$_3$), 0.76 (quartet, $^3J_{HH}$=7.4, 12 H, CH$_2$) $^{13}$P NMR data (CDCl$_3$, 25° C., referenced to external 85% H$_3$PO$_4$): δ−14.5 (doublet, $^1J_HP$=695 Hz).

Example 3

An oven-dried 1-liter glass bottle was capped with a self-sealing rubber liner and a perforated metal cap. After the bottle was thoroughly purged with a stream of dry nitrogen gas, the bottle was charged with 236 g of a 1,3-butadiene/hexanes blend containing 21.2% by weight of 1,3-butadiene. The following catalyst ingredients were then added to the bottle in the following order: (1) 0.30 mmol of molybdenum 2-ethylhexanoate, (2) 1.20 mmol of bis(trimethylsilyl) phosphonate, and (3) 3.60 mmol of tri-n-butylaluminum. The bottle was tumbled for 21 hours in a water bath maintained at 65° C. The polymerization mixture was coagulated with 3 liters of isopropanol containing 2,6-di-tert-butyl-4-methylphenol as the antioxidant. The resulting syndiotactic 1,2-polybutadiene was isolated by filtration and dried to a constant weight under vacuum at 60° C. The yield of the polymer was 44.6 g (89% yield). As measured by differential scanning calorimetry (DSC), the polymer had a melting temperature of 165° C. The $^1$H and $^{13}$C nuclear magnetic resonance (NMR) analysis of the polymer indicated a 1,2-linkage content of 89.4% and a syndiotacticity of 83.1%. As determined by gel permeation chromatography (GPC), the polymer had a weight average molecular weight (M$_w$) of 622,000, a number average molecular weight (M$_n$) of 330,000, and a polydispersity index (M$_w$/M$_n$) of 1.9. The monomer charge, the amounts of the catalyst ingredients, and the properties of the resulting syndiotactic 1,2-polybutadiene are summarized in Table I.

TABLE I

| Example No. | 3 | 4 | 5 |
|---|---|---|---|
| 21.2% 1,3-Bd/hexanes (g) | 236 | 236 | 236 |
| Mo 2-ethylhexanoate (mmol) | 0.30 | 0.30 | 0.30 |
| HP(O)(OSiMe$_3$)$_2$ (mmol) | 1.20 | 1.20 | 1.20 |
| n-Bu$_3$Al (mmol) | 3.60 | 3.30 | 3.90 |
| Mo/P/Al molar ratio | 1:4:12 | 1:4:11 | 1:4:13 |
| Polymer yield (%) after 21 hr at 65° C. | 89 | 87 | 86 |
| Melting temperature (° C.) | 165 | 165 | 165 |
| M$_w$ | 622,000 | 573,000 | 571,000 |
| M$_n$ | 330,000 | 316,000 | 273,000 |
| M$_w$/M$_n$ | 1.9 | 1.9 | 2.1 |

Examples 4 and 5

In Examples 4 and 5, the procedure described in Example 3 was repeated except that the catalyst ingredient ratio was varied as shown in Table I. The monomer charge, the amounts of the catalyst ingredients, and the properties of the resulting syndiotactic 1,2-polybutadiene are summarized in Table I.

Examples 6–8

In Examples 6–8, the procedure described in Example 3 was repeated except that triisobutylaluminum was substituted for that tri-n-butylaluminum, and the catalyst ingredient ratio was varied as shown in Table II. The $^1$H and $^{13}$C NMR analysis of the polymer produced in Example 7 indicated a 1,2-linkage content of 92.8% and a syndiotacticity of 89.9%. The monomer charge, the amounts of the catalyst ingredients, and the properties of the resulting syndiotactic 1,2-polybutadiene are summarized in Table II.

TABLE II

| Example No. | 6 | 7 | 8 |
|---|---|---|---|
| 21.2% 1,3-Bd/hexanes (g) | 236 | 236 | 236 |
| Mo 2-ethylhexanoate (mmol) | 0.30 | 0.30 | 0.30 |
| HP(O)(OSiMe$_3$)$_2$ (mmol) | 1.20 | 1.20 | 1.20 |
| i-Bu$_3$Al (mmol) | 2.70 | 3.00 | 3.30 |
| Fe/P/Al molar ratio | 1:4:9 | 1:4:10 | 1:4:11 |
| Polymer yield (%) after 21 hr at 65° C. | 83 | 85 | 82 |
| Melting temperature (° C.) | 186 | 185 | 186 |
| M$_w$ | 1,164,000 | 1,097,000 | 1,190,000 |
| M$_n$ | 575,000 | 512,000 | 571,000 |
| M$_w$/M$_n$ | 2.0 | 2.2 | 2.1 |

Examples 9–11

In Examples 9–11, the procedure described in Example 3 was repeated except that bis(triethylsilyl)phosphonate was substituted for bis(trimethylsilyl)phosphonate, and the catalyst ingredient ratio was varied as shown in Table III. The monomer charge, the amounts of the catalyst ingredients, and the properties of the resulting syndiotactic 1,2-polybutadiene are summarized in Table III.

TABLE III

| Example No. | 9 | 10 | 11 |
|---|---|---|---|
| 21.2% 1,3-Bd/hexanes (g) | 236 | 236 | 236 |
| Mo 2-ethylhexanoate (mmol) | 0.30 | 0.30 | 0.30 |
| HP(O)(OSiEt$_3$)$_2$ (mmol) | 1.20 | 1.20 | 1.20 |

TABLE III-continued

| Example No. | 9 | 10 | 11 |
|---|---|---|---|
| n-Bu₃Al (mmol) | 3.00 | 3.30 | 3.60 |
| Fe/P/Al molar ratio | 1:4:10 | 1:4:11 | 1:4:12 |
| Polymer yield (%) after 21 hr at 65° C. | 28 | 26 | 25 |
| Melting temperature (° C.) | 187 | 186 | 187 |
| $M_w$ | 698,000 | 794,000 | 810,000 |
| $M_n$ | 382,000 | 410,000 | 401,000 |
| $M_w/M_n$ | 1.8 | 1.9 | 2.0 |

Examples 12–14

In Examples 12–14, the procedure described in Example 3 was repeated except that bis(triethylsilyl)phosphonate was substituted for bis(trimethylsilyl)phosphonate, triisobutylaluminum was substituted for tri-n-butylaluminum, and the catalyst ingredient ratio was varied as shown in Table IV. The monomer charge, the amounts of the catalyst ingredients, and the properties of the resulting syndiotactic 1,2-polybutadiene are summarized in Table IV.

TABLE IV

| Example No. | 12 | 13 | 14 |
|---|---|---|---|
| 21.2% 1,3-Bd/hexanes (g) | 236 | 236 | 236 |
| Mo 2-ethylhexanoate (mmol) | 0.30 | 0.30 | 0.30 |
| HP(O)(OSiEt₃)₂ (mmol) | 1.20 | 1.20 | 1.20 |
| i-Bu₃Al (mmol) | 2.70 | 3.00 | 3.30 |
| Fe/P/Al molar ratio | 1:4:9 | 1:4:10 | 1:4:11 |
| Polymer yield (%) after 21 hr at 65° C. | 14 | 14 | 15 |
| Melting temperature (° C.) | 191 | 191 | 191 |
| $M_w$ | 1,205,000 | 1,188,000 | 1,212,000 |
| $M_n$ | 585,000 | 582,000 | 561,000 |
| $M_w/M_n$ | 2.1 | 2.0 | 2.2 |

Various modifications and alterations that do not depart from the scope and spirit of this invention will become apparent to those skilled in the art. This invention is not to be duly limited to the illustrative embodiments set forth herein.

What is claimed is:

1. A catalyst composition that is the combination of or the reaction product of ingredients comprising:

(a) an molybdenum-containing compound;

(b) a silyl phosphonate; and (c) an organoaluminum compound.

2. The catalyst composition of claim 1, where said molybdenum-containing compound is a molybdenum carboxylate, molybdenum organophosphate, molybdenum organophosphonate, molybdenum organophosphinate, molybdenum carbamate, molybdenum dithiocarbamate, molybdenum xanthate, molybdenum β-diketonate, molybdenum alkoxide, molybdenum aryloxide, molybdenum halide, molybdenum pseudo-halide, molybdenum oxyhalide, organomolybdenum compound or mixture thereof.

3. The catalyst composition of claim 1, where said silyl phosphonate is an acyclic silyl phosphonate defined by the following structure:

$$\begin{array}{c} \text{R}^1 \\ | \\ \text{O}-\text{Si}-\text{R}^1 \\ \diagup \quad | \\ \text{O} \quad \text{R}^1 \\ \| \\ \text{H}-\text{P} \\ \diagdown \quad \text{R}^1 \\ \text{O}-\text{Si}-\text{R}^1 \\ | \\ \text{R}^1 \end{array}$$

where each R¹, which may be the same or different, is a hydrogen atom or a mono-valent organic group.

4. The catalyst composition of claim 3, where R¹ is an alkyl, cycloalkyl, substituted cycloalkyl, alkenyl, cycloalkenyl, substituted cycloalkenyl, aryl, substituted aryl, aralkyl, alkaryl, allyl, or alkynyl group.

5. The catalyst composition of claim 4, where said acyclic silyl phosphonate is bis(trimethylsilyl)phosphonate, bis(triethylsilyl)phosphonate, bis(tri-n-propylsilyl) phosphonate, bis(triisopropylsilyl)phosphonate, bis(tri-n-butylsilyl)phosphonate, bis(tricyclohexylsilyl) phosphonate, bis(triphenylsilyl) phosphonate, bis[tris(2-ethylhexyl)silyl] phosphonate, or bis[tris(2,4,6-trimethylphenyl)silyl] phosphonate.

6. The catalyst composition of claim 1, where said silyl phosphonate is a cyclic silyl phosphonate that is defined by the following structure:

$$\begin{array}{c} \text{R}^1 \\ | \\ \text{O}-\text{Si} \\ \diagup \quad | \quad \diagdown \\ \text{O} \quad \text{R}^1 \\ \| \quad \quad \quad \text{R}^3 \\ \text{H}-\text{P} \quad \quad \diagup \\ \diagdown \quad \text{R}^1 \\ \text{O}-\text{Si} \\ | \\ \text{R}^1 \end{array}$$

where each R², which may be the same or different, is a hydrogen atom or a mono-valent organic group, and R³ is a bond between silicon atoms or a divalent organic group.

7. The catalyst composition of claim 6, where R² is an alkyl, cycloalkyl, substituted cycloalkyl, alkenyl, cycloalkenyl, substituted cycloalkenyl, aryl, substituted aryl, aralkyl, alkaryl, allyl, or alkynyl group, and where R³ is an alkylene, substituted alkylene, cycloalkylene, substituted cycloalkylene, alkenylene, substituted alkenylene, cycloalkenylene, substituted cycloalkenylene, arylene, or substituted arylene group.

8. The catalyst composition of claim 7, where said cyclic silyl phosphonate is 2-oxo-(2H)-4,5-disila-1,3,2-dioxaphospholane, 2-oxo-(2H)-4,5-disila-4,4,5,5-tetramethyl-1,3,2-dioxaphospholane, 2-oxo-(2H)-4,5-disila-4,4,5,5-tetraphenyl-1,3,2-dioxaphospholane, 2-oxo-(2H)-4,6-disila-1,3,2-dioxaphosphorinane, 2-oxo-(2H)-4,6-disila-4,4,6,6-tetramethyl-1,3,2-dioxaphosphorinane, 2-oxo-(2H)-4,6-disila-4,4,6,6-tetraethyl-1,3,2-dioxaphosphorinane, 2-oxo-(2H)-4,6-disila-4,4,6,6-tetraphenyl-1,3,2-dioxaphosphorinane, 2-oxo-(2H)-4,6-disila-4,4,6,6-tetrabenzyl-1,3,2-dioxaphosphorinane, 2-oxo-(2H)-4,6-disila-4,6-dimethyl-1,3,2-dioxaphosphorinane, or 2-oxo-(2H)-4,6-disila-4,6-diethyl-1,3,2-dioxaphosphorinane.

9. The catalyst composition of claim 1, where the organoaluminum compound is defined by the formula $AlR_nX_{3-n}$, where each R, which may be the same or different, is a mono-valent organic group that is attached to the aluminum atom via a carbon atom, where each X, which may be the same or different, is a hydrogen atom, a carboxylate group, an alkoxide group, or an aryloxide group, and where n is an integer of 1 to 3.

10. The catalyst composition of claim 9, where each R is an alkyl, cycloalkyl, substituted cycloalkyl, alkenyl, cycloalkenyl, substituted cycloalkenyl, aryl, substituted aryl, aralkyl, alkaryl, allyl, or alkynyl group.

11. The catalyst composition of claim 10, where said organoaluminum compound is trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum aryloxide, hydrocarbylaluminum diaryloxide or mixtures thereof.

12. The catalyst composition of claim 1, where said organoaluminum compound is an oligomeric linear aluminoxane, an oligomeric cyclic aluminoxane, or a mixture thereof, where the oligomeric linear aluminoxane is defined by the formula:

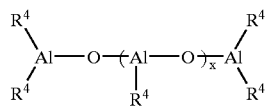

and the oligomeric cyclic aluminoxane is defined by the formula:

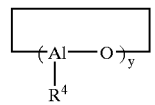

where x is an integer of 1 to about 100; y is an integer of 2 to about 100; and where each $R^4$, which may be the same or different, is a mono-valent organic group that is attached to the aluminum atom via a carbon atom.

13. The catalyst composition of claim 12, where $R^4$ is an alkyl, cycloalkyl, substituted cycloalkyl, alkenyl, cycloalkenyl, substituted cycloalkenyl, aryl, substituted aryl, aralkyl, alkaryl, allyl, or alkynyl group.

14. The catalyst composition of claim 13, where said aluminoxane is methylaluminoxane, modified methylaluminoxane, ethylaluminoxane, n-propylaluminoxane, isobutylaluminoxane, or mixtures thereof.

15. The catalyst composition of claim 1, where the molar ratio of said organoaluminum compound to said molybdenum-containing compound is from about 1:1 to about 200:1, and the molar ratio of said silyl phosphonate to said molybdenum-containing compound is from about 0.5:1 to about 50:1.

16. The catalyst composition of claim 15, where the molar ratio of said organoaluminum compound to said molybdenum-containing compound is from about 2:1 to about 100:1, and the molar ratio of the silyl phosphonate to said molybdenum-containing compound is from about 1:1 to about 25:1.

17. A catalyst composition formed by a process comprising the steps of combining:
   (a) a molybdenum-containing compound;
   (b) a silyl phosphonate; and
   (c) an organoaluminum compound.

18. A process for forming conjugated diene polymers comprising the step of:
   polymerizing conjugated diene monomers in the presence of a catalytically effective amount of a catalyst composition formed by combining:
   (a) a molybdenum-containing compound;
   (b) a silyl phosphonate; and
   (c) an organoaluminum compound.

19. The process of claim 18, where said conjugated diene monomers are 1,3-butadiene, thereby forming syndiotactic 1,2-polybutadiene.

20. The process of claim 18, where said catalytically effective amount includes from about 0.01 to about 2 mmol per 100 g of monomer.

* * * * *

UNITED STATES PATENT AND TRADEMARK OFFICE
CERTIFICATE OF CORRECTION

PATENT NO.  : 6,545,107 B2
DATED       : April 8, 2003
INVENTOR(S) : Luo et al.

It is certified that error appears in the above-identified patent and that said Letters Patent is hereby corrected as shown below:

Title page, Item [54] and Column 1, line 1,
Title, "MOLYDENUM" should be spelled -- MOLYBDENUM --

Column 6,
Lines 54-62, that portion of the structure reading should read

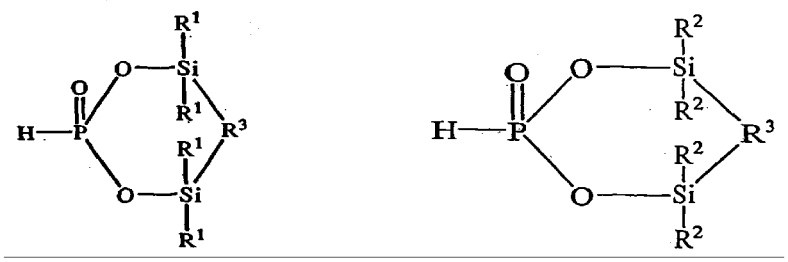

Column 18,
Lines 30-37, that portion of the structure reading should read

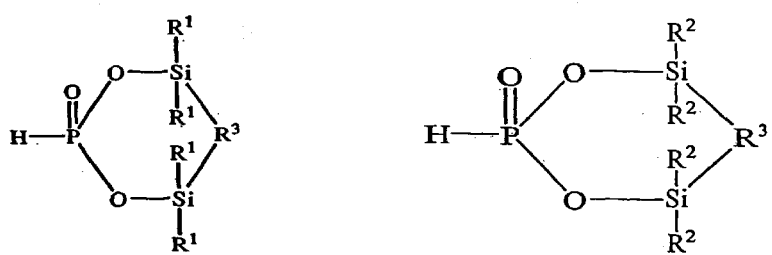

Signed and Sealed this

Twenty-fourth Day of August, 2004

JON W. DUDAS
*Director of the United States Patent and Trademark Office*